Sept. 3, 1940.　　E. W. SCHELLENTRAGER　　2,213,639
WEIGHING AND CHARGING APPARATUS
Filed Nov. 18, 1938　　　4 Sheets-Sheet 1

INVENTOR
EUGENE W. SCHELLENTRAGER
BY
Hyde, Higley & Meyer
ATTORNEYS

Sept. 3, 1940.  E. W. SCHELLENTRAGER  2,213,639
WEIGHING AND CHARGING APPARATUS
Filed Nov. 18, 1938  4 Sheets-Sheet 3

INVENTOR
EUGENE W. SCHELLENTRAGER
BY
Hyde, Hinkley & Meyer
ATTORNEYS

Sept. 3, 1940.    E. W. SCHELLENTRAGER    2,213,639
WEIGHING AND CHARGING APPARATUS
Filed Nov. 18, 1938    4 Sheets-Sheet 4

INVENTOR
EUGENE W. SCHELLENTRAGER
BY
Hyde, Higley & Meyer
ATTORNEYS

Patented Sept. 3, 1940

2,213,639

UNITED STATES PATENT OFFICE 2,213,639

WEIGHING AND CHARGING APPARATUS

Eugene W. Schellentrager, Shaker Heights, Ohio, assignor to The Atlas Bolt & Screw Company, Cleveland, Ohio, a corporation of Ohio Application November 18, 1938, Serial No. 241,095

10 Claims. (Cl. 214—2)

This invention relates to improvements in weighing and charging apparatus and more particularly to apparatus for handling a plurality of receptacles adapted to be repeatedly loaded, weighed and emptied.

My invention is applicable to the handling of various types of receptacles in various industrial applications but for purposes of illustration I have illustrated the same as applied to the handling of buckets loaded with pig iron and scrap for charging into a cupola for melting. My invention will therefore be described with reference to this particular adaptation using such specific terms as there apply but with the intent to cover all analogous installations.

One of the objects of my invention is to provide apparatus for loading, weighing and handling a plurality of buckets with a minimum number of attendants.

Another object of the invention is to provide novel equipment for moving empty buckets from overhead handling equipment to a loading point and for weighing and returning the loaded buckets to the overhead handling equipment.

My invention also includes various specialized forms of apparatus for handling the buckets one by one to a weighing scale and a specialized arrangement of conveyers leading to and from the weighing scale, together with means for transferring the buckets between conveyers and for discharging the loaded buckets from the weighing scale. The invention also comprises a novel arrangement of the indicator of the weighing scale so that it is easily read from the overhead crane which loads the buckets.

Other objects and advantages of my invention will be apparent from the accompanying drawings and description and the essential features thereof will be set forth in the appended claims.

Figure 1:
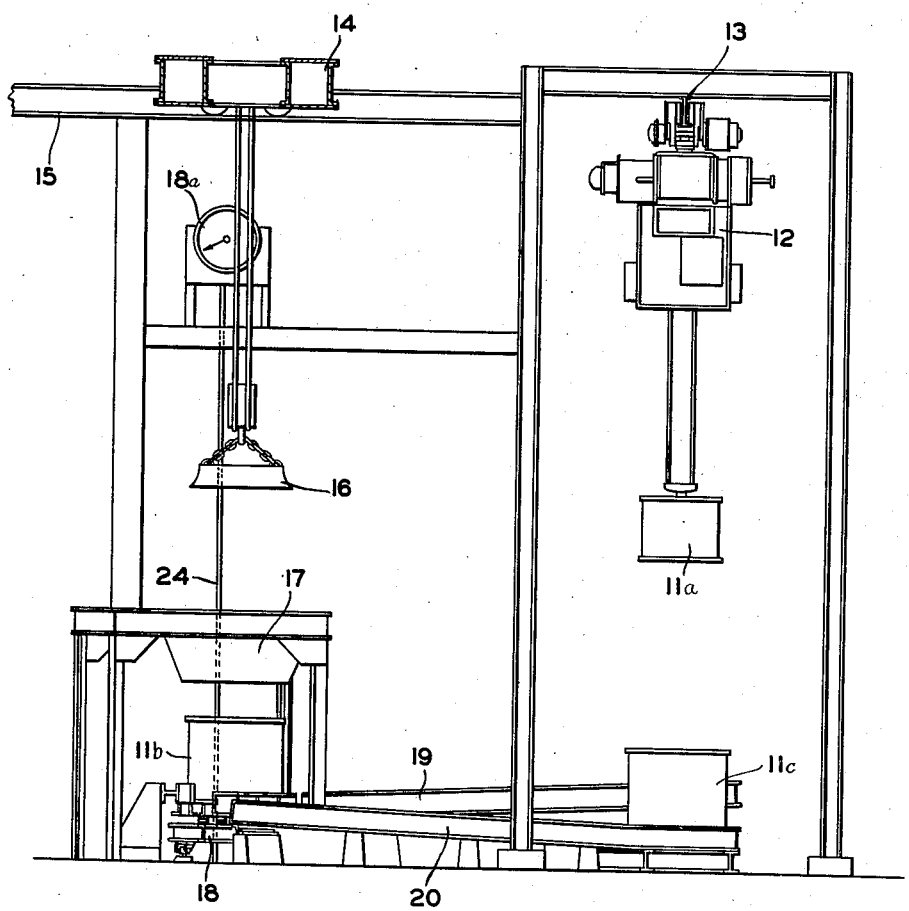
Figure 2:
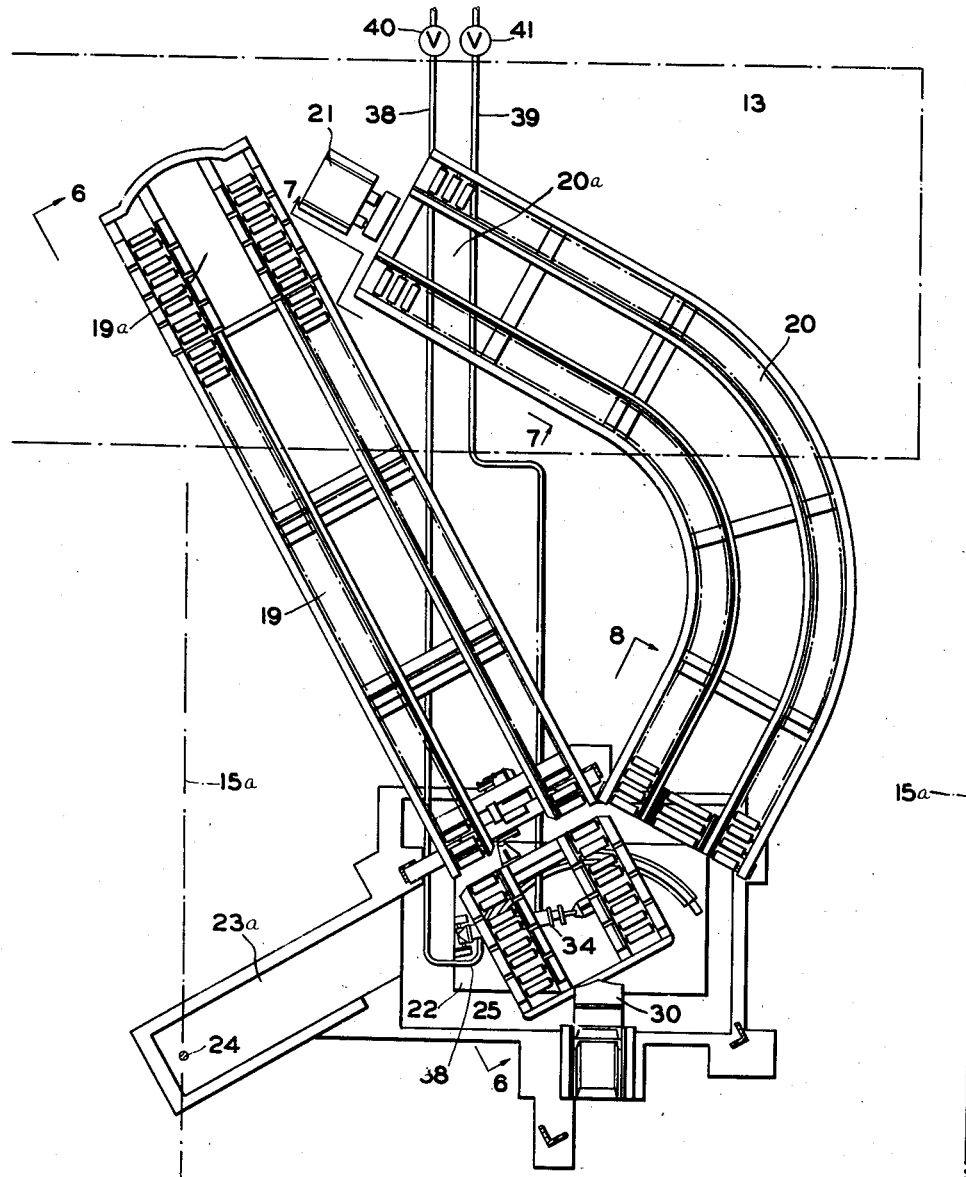
Figure 3:
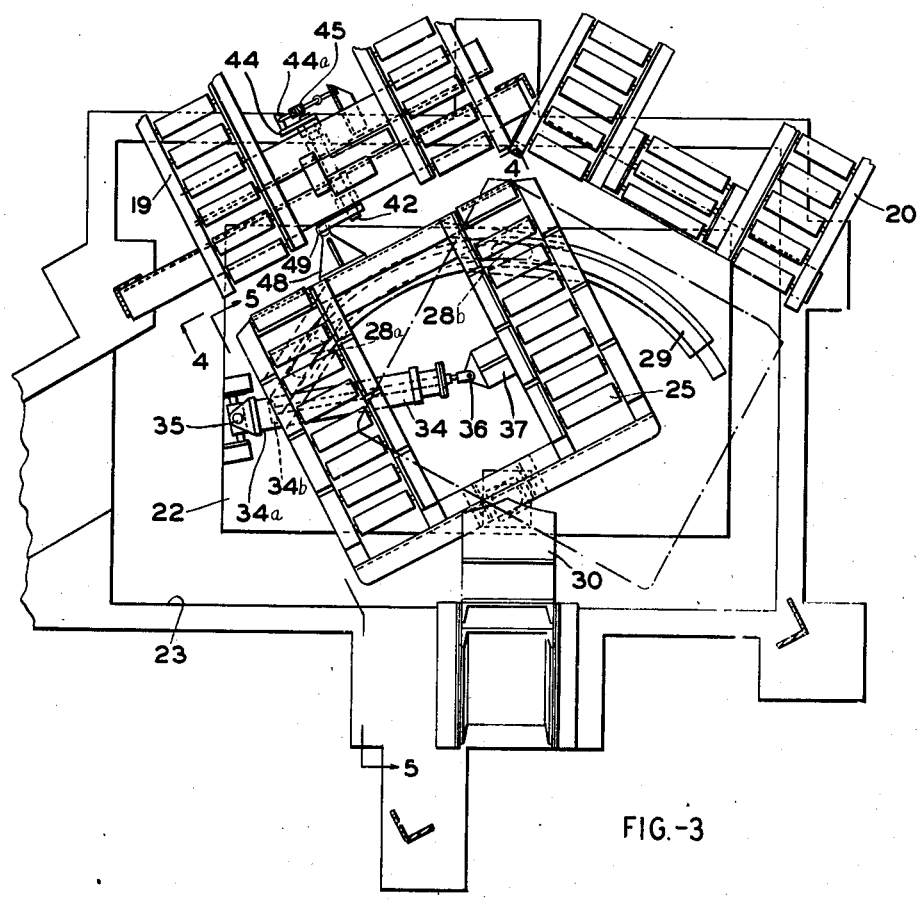
Figure 4:
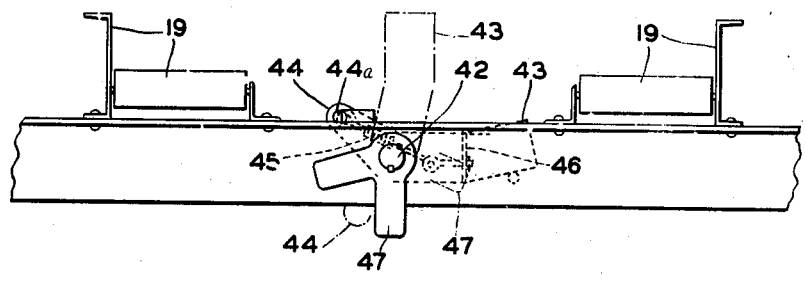
Figure 5:
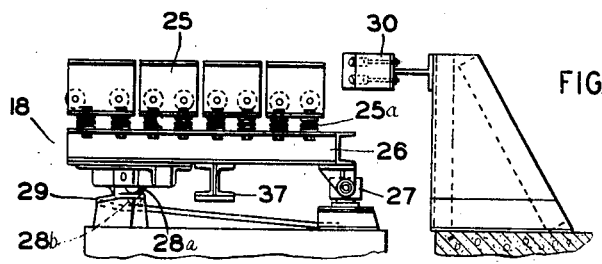
Figure 6:
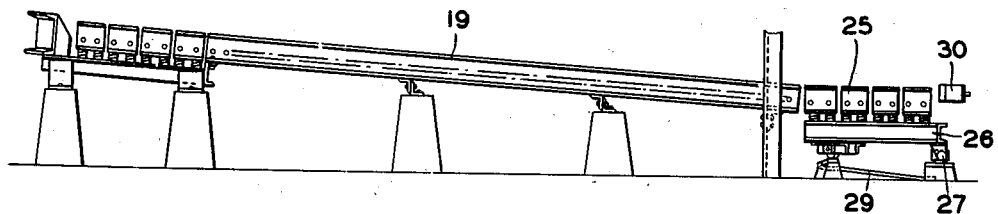
Figure 7:
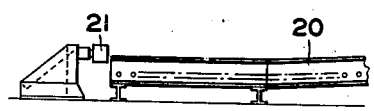
Figure 8:
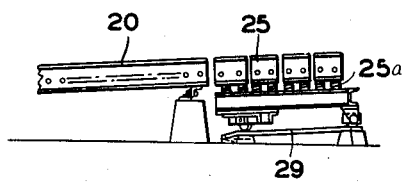
Figure 9:
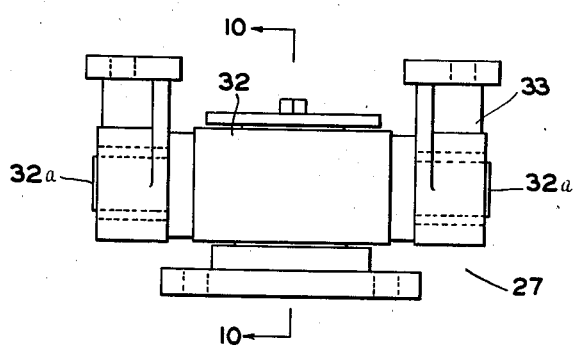
Figure 10:
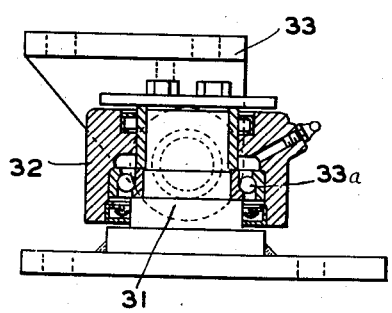

In the drawings, Fig. 1 is an elevation of the entire layout including two crane runways, a weighing scale and the conveyers leading to and from the scale; Fig. 2 is a plan view of the conveyers and the weighing scale; Fig. 3 is an enlarged plan view of the weighing scale and the ends of the conveyers adjacent thereto; Fig. 4 is an enlarged elevation of certain stop mechanism taken along the line 4—4 of Fig. 3; Fig. 5 is an elevation of the weighing scale platform taken along the line 5—5 of Fig. 3; Figs. 6, 7 and 8 are side elevations of the conveyers taken in the direction of the similarly numbered lines of Fig. 2; Fig. 9 is a greatly enlarged view of the pivotal mounting for the scale platform; while Fig. 10 is a sectional view of the same taken along the line 10—10 of Fig. 9.

Referring first to Fig. 1, I have shown a plurality of buckets 11a, 11b, 11c adapted to be handled in a system such as is here illustrated. The bucket 11a is handled to and from a cupola by the crane 12 which is carried by the runway 13. The crane 14 is indicated only diagrammatically and in section and one of the runways for this crane is shown at 15. The overhead positions of the crane runway structures are shown in dash-dot lines, one of said structures being marked 15a on Fig. 2. The crane 14 is provided with a magnet 16 for handling pig iron and scrap from a storage yard to a hopper 17 whence it may be discharged into a receptacle 11b which rests upon the scale platform 18. The scale reading is indicated on the dial at 18a which is in an elevated position where it is readily seen and read by the operator of the crane 14. The conveyer 19 handles empty buckets which are placed upon it by the crane 12 for movement to the scale 18 where the buckets are loaded. The conveyer 20 handles loaded buckets from the scale 18 to the position shown at 11c where loaded buckets are picked up by the crane 12. As stated above one of the objects of the present invention is to provide apparatus by which buckets may be expeditiously handled using but one man on the ground cooperating with the operators of the cranes 12 and 14.

While my invention might be carried out in various ways and with different types of conveyers, I have shown in Figs. 2, 6, 7 and 8 gravity conveyers, namely, 19, for handling empty buckets from the cupola charging crane runway to the weighing scale, and conveyer 20 for bringing the loaded buckets from the weighing scale back to a point beneath the cupola charging crane. Sometimes these conveyers meet at an angle near the scale not substantially over 90°. In fact the conveyers 19 and 20 are shown as meeting near the scale at an angle considerably less than 90°. This saves considerable yard space as against a conveyer layout wherein the buckets would travel more or less in a circle from the point 19a where empties are placed on the conveyer 19 to the point 20a where loads are removed from the conveyer 20. The conveyers 19 and 20 are provided with parallel sets of rollers and so inclined that the buckets roll along at suitable speeds. Adjacent the point 19a the conveyer is supported on springs to reduce shock. The conveyers have suitable side skirt boards to retain the buckets. A stop 21 is provided to halt the movement of loaded buckets at the end of their travel on conveyer 20. It will be seen that conveyer 19 is sufficiently long so that a plurality of empty buckets may be stored in advance of the weighing scale and conveyer 20 is of sufficient length to store a plurality of loaded buckets so that there need be no interruptions in the various operations.

The weighing scale 18 comprises a platform 22 supported upon suitable beams and knife edges located in the pit 23. It is thought unnecessary to show the details of this scale equipment as obviously my invention may be utilized with any standard type of scale. The scale here shown is a standard type produced by The Atlas Car and Manufacturing Company and has suitable links and levers extending from the scale mechanism in pit 23 along the ground in pit 23a to the rod 24 which extends upwardly to the indicating dial 18a. Thus as buckets are loaded on scale 18 the weight is indicated by this scale mechanism acting through rod 24 to indicate the weight of the loaded bucket at 18a. This dial is so located on the crane runway that it is easily read by an operator in the cab of crane 14 so that he may accurately load the desired weight of pig iron and scrap into the bucket 11b.

The scale platform 22 supports a set of rollers 25 adapted to receive an empty bucket from conveyer 19 for loading and weighing, after which the bucket is discharged to conveyer 20. The set of rollers is carried preferably by springs 25a on a sub-frame 26 which at one side is supported on a bearing 27 for pivotal movement of the set of rollers in a horizontal plane and for tilting of the set of rollers in a vertical plane to discharge a loaded bucket to the conveyer 20. To this end the side of the sub-frame 26 opposite the pivot mounting 27 is supported by wheels 28 on an arcuate and inclined track 29 which is of course also carried by the platform 22. As shown in Fig. 5 the wheel at 28a is mounted for rotation between a pair of angles secured to the sub-frame 26. The wheel at 28b is mounted in a similar manner but set somewhat lower so that in the full line position of the set of rollers shown in Fig. 3, the wheels 28 support the sub-frame 26 and the set of rollers 25 in a substantially horizontal position for receiving an empty bucket from conveyer 19 and for weighing the bucket as it is loaded. Preferably the inclined track 29 has flat spots where the wheels 28 rest upon it during the receiving and weighing operation, or in the position shown in full lines in Fig. 3. A bumper 30 serves to stop an empty bucket as it runs onto the set of rollers 25 and properly positions the bucket on the scale platform. It will be obvious that as the sub-frame 26 and the set of rollers 25 is turned about the pivotal mounting 27 from the full line position of Fig. 3 to the dot-dash position that the wheels 28 will travel about the track 29 so as to tilt the set of rollers 25 to cause the loaded bucket to run off the scale platform onto the conveyer 20 where the incline of that conveyer will carry the bucket along.

The details of the pivotal mounting 27 are shown in Figs. 9 and 10. The center pin 31 is rigidly mounted on the platform 22. The sleeve portion 32 is carried by the ball bearing 33a on the center pin 31. The sleeve 32 is part of a bracket 33 which is rigidly fastened to the sub-frame 26. The sleeve 32 carries laterally extending trunnions 32a which are mounted in suitable bearings in the bracket 33. Thus the parts 31, 32 permit a horizontal pivoting action of the sub-frame 26 while the parts 32a, 33 permit a vertical tilting action of the sub-frame 26.

Preferably remotely controlled power means is provided for moving the set of rollers 25 between its two positions shown in full lines and in dot-dash lines in Fig. 3. The means here shown comprises a double-acting cylinder and piston motor 34. The cylinder 34a is mounted for pivoting and tilting movement at the point 35. The piston 34b has its piston rod connected at 36 to a member 37 which is rigid with the sub-frame 26. A suitable fluid supply is provided for motor 34 and comprises suitable exhaust ports together with an inlet line 38 leading to the left end of cylinder 34a, and an inlet pipe 39 leading to the right-hand end of cylinder 34a. These lines are preferably carried to a point beneath the runway of crane 12 where they are provided respectively with control valves 40 and 41. Thus one operator standing beneath the runway of crane 12 may unhook the overhead crane from an empty bucket at the point 19a or hook the crane to a loaded bucket at the point 20a and by manipulation of valves 40 and 41 may control the movement of the set of rollers 25 to receiving position in line with conveyer 19 or to discharge position in line with conveyer 20. Thus the entire operation may be carried out using but one man located on the ground and at a safe distance from flying scrap iron near the weighing scales.

Preferably means is provided for holding back any empty buckets which may be standing on conveyer 19 other than the single bucket transferred from this conveyer to the scale platform. This stop means is shown in plan in Fig. 3 and in more detail in elevation in Fig. 4. A shaft 42 is mounted in suitable stationary bearings and carries a stop member 43 which is carried by shaft rotation from the substantially horizontal position shown in full lines in Fig. 4 to the vertical position shown in dot-dash lines therein. In its horizontal position the stop permits movement of the buckets along the rollers of conveyer 19 while in its raised position it holds back the buckets. A lever 44 is connected to one end of shaft 42 and has at its outer end a pin 44a to which is attached one end of a spring 45, the other end of which is secured to a fixed bracket 46. The location of the spring and lever is such that as the stop 43 moves from its horizontal to its vertical position the spring 45 is carried from one side of shaft 42 to the other side thereof so that spring 45 holds the stop in either position in which it is placed. Means is provided for automatically moving the stop 43 in timed relation to the movement of the set of rollers 25 on the scale platform. This means comprises a bifurcated lever 47 on the end of shaft 42 toward the scale. Fastened to the scale itself is a bracket 48 carrying a roller 49 which lies between the arms of the bifurcated lever. The position of the parts is such that as the set of rollers 25 moves from the full line position of Fig. 3 to the dot-dash line position the bifurcated lever 47 is rotated counter-clockwise from its full line position of Fig. 4 so as to move the stop 43 from its horizontal position to its vertical position. On return movement of the set of rollers 25 the shaft 42 is rotated in a clockwise direction so as to again return the stop 43 to its horizontal position. It results from this arrangement that when the set of rollers 25 is in position to receive an empty bucket from conveyer 19, the stop 43 is in its horizontal or inoperative position and as the scale moves to its discharging position the stop 43 becomes operative to prevent buckets coming down the conveyer 19 from running off the end thereof.

What I claim is:

1. Apparatus for weighing and charging a plurality of receptacles, including a weighing scale and two conveyer members meeting adjacent said scale at an angle, said scale including a platform including a set of rollers and being mounted for horizontal pivoting movement and vertical tilting movement, a rolling support for said platform as it moves about its pivot mounting from alinement with one of said conveyer members to alinement with the other of said conveyer members, and an inclined track for said rolling support arranged to tilt said platform as it moves about its pivot mounting.

2. Apparatus for handling heavy receptacles adapted to be repeatedly heavily loaded and emptied, comprising a receptacle handling crane movable back and forth along a zone of operations, substantially continuous gravity conveyer means having upper receiving and lower discharging end portions located at different levels in said zone and closely related to each other and thereby operatively related to said crane, and means for interrupting travel of a receptacle along said conveyer means at a point intermediate its end portions to enable the receptacle to be filled.

3. Apparatus of the character described in claim 2, including a weighing scale upon which the receptacle is held stationary while being filled during interruption of its travel, said scale including a platform movable either to horizontal position for holding the receptacle stationary or to an inclined position in which the receptacle by gravity is caused to resume its travel toward the discharge end of said conveyor means.

4. Apparatus of the character described in claim 2, including a weighing scale upon which the receptacle is held stationary while being filled during interruption of its travel, said scale including a platform movable either to horizontal position for holding the receptacle stationary or to an inclined position in which the receptacle by gravity is caused to resume its travel toward the discharge end of said conveyer means, the conveyer means having upper and lower portions which respectively extend toward and from the scale along paths which diverge at an acute angle.

5. Apparatus of the character described in claim 2, including a weighing scale upon which the receptacle is held stationary while being filled during interruption of its travel, said scale including a platform which is rotatable about a vertical axis into operative registration with either portion of said conveyer means.

6. Apparatus of the character described in claim 2, including a weighing scale upon which the receptacle is held stationary while being filled during interruption of its travel, said scale including a platform which is rotatable about a vertical axis into operative registration with either portion of said conveyer means and being also movable either to a horizontal position for holding the receptacle stationary when in registration with the upper portion of said conveyer means or to an inclined position in which the receptacle by gravity is caused to resume travel toward the discharge end of said conveyer means when said platform is in registration with the lower portion of said conveyer means.

7. Apparatus of the character described in claim 2, including a weighing scale platform movable into cooperative relation with either of the two portions of said conveying means, and in which the receiving and discharging end portions of said conveyer means are closely adjacent, together with means closely adjacent thereto for controlling operation of said scale operation.

8. Apparatus of the character described in claim 2, including a weighing scale upon which the receptacle is held stationary while being filled during interruption of its travel, said scale having a platform movable either to horizontal position for holding the receptacle stationary or to an inclined position in which the receptacle is caused to resume travel toward the discharge end of said conveyer means, and means controllable from a point closely adjacent the end portions of said conveyer means for controlling operation of said scale platform.

9. Apparatus of the character described in claim 2, including a weighing scale having a platform upon which the receptacle is held stationary while being filled, said platform being rotatable about a vertical axis into registration with either the upper receiving or the lower discharging end portion of said conveyer means, and means controllable by motion of said platform around said vertical axis for preventing advance of a receptacle from said conveyer means to said platform unless said platform is in operative registration with the upper receiving end portion of said conveyer means.

10. Apparatus of the character described in claim 2, including a weighing scale having a platform upon which the receptacle is held stationary while being filled, said platform being rotatable about a vertical axis into registration with either the upper receiving or the lower discharging end portion of said conveyer means, means controllable by motion of said platform around said vertical axis for preventing advance of a receptacle from said conveyer means to said platform unless said platform is in operative registration with the upper receiving end portion of said conveyer means, and means operatable from a point closely adjacent the end portions of said conveyer means for controlling motion of said platform about said vertical axis.

EUGENE W. SCHELLENTRAGER.